Patented Jan. 10, 1933

1,894,230

UNITED STATES PATENT OFFICE

ALBERT M. CLIFFORD, OF STOW, OHIO, ASSIGNOR TO THE GOODYEAR TIRE & RUBBER COMPANY, OF AKRON, OHIO, A CORPORATION OF OHIO

AGE RESISTOR

No Drawing.    Application filed September 14, 1931.   Serial No. 562,826.

My invention relates to methods of preserving organic materials more particularly it relates to methods of preserving rubber, balata and similar rubber-like substances.

One object of the invention is to provide a method of treating materials of the above indicated character whereby to retard the decay and resultant loss of tensile strength and elasticity thereof, occasioned by the attacks of atmospheric oxygen, sunlight and heat. Another object is to provide a rubber product having the characteristics referred to. Other objects and advantages will become apparent from the following description.

Heretofore it has been observed that certain organic substances, such as reaction products of aldol and alpha naphthylamine, hydroquinone and similar substances, when incorporated in rubber, have the effect of retarding the action of oxygen, sunlight and heat which, under ordinary circumstances, cause premature decay and degeneration of rubber materials. Although many substances having similar age retarding properties are known to the industry, most of such materials heretofore employed for this purpose are objectionable for various reasons; for example, some of them are poisonous to the workmen employed in handling them and, therefore, in order to use them in commercial practice, it has been necessary to take great precautions in order to overcome these effects. Still other materials are only mildly antioxidant in their properties, or are objectionable because they can not be incorporated in rubber except by subjecting the latter to excessive milling operations, or because they are too expensive for commercial application.

My invention resides in the discovery that certain of the hydroxy derivatives of the hydrocarbons contained in that fraction of coal tar boiling between 265, 400 degrees C. and termed the methyl naphthalene or anthracene oil fraction, constitute excellent preservatives or age resistors for rubber. As a specific example of a material of this class, attention is called to 2-hydroxy fluorene, having the formula

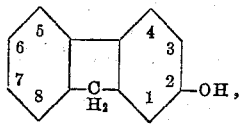

reference to which may be found in Journal of the American Chemical Society, volume 93, 17–65. This material may be prepared by stirring 1 mol of 2-amino fluorene and 3 mols of hydrochloric acid in water, adding 1 mol of 10 percent sodium sulfide, and boiling the mixture for a period of 10 or 15 minutes. At the conclusion of this reaction, sodium hydroxide is added until the solution becomes basic after which it is subjected to filtration. The hydroxy fluorene contained in the solution may be precipitated by the addition of hydrochloric acid. Purification of the reaction product is effected by precipitating it from alkaline solution and subsequently recrystallizing it from alcohol. The pure material has a melting point of 166 degrees C. This method of preparation may also be employed in the manufacture of other structurally similar compounds contained in this fraction of the coal tar distillate. For example, it has been found to be quite satisfactory in the manufacture of hydroxy biphenylene oxide, a material having the formula:

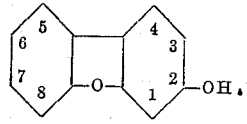

The compounds thus obtained may be added with satisfactory results to substantially any of the ordinary rubber compounds. However, the following constitute examples of such materials in which they are found by actual experience to be particularly satisfactory.

Formula A

| | Parts |
|---|---|
| Pale crepe rubber | 100 |
| Zinc oxide | 5 |
| Sulfur | 3 |
| Hexamethylene tetramine | 1 |
| Stearic acid | 1.5 |
| Antioxidant | 1 |

Formula B

| | Parts |
|---|---|
| Smoked sheet rubber | 100 |
| Zinc oxide | 92.5 |
| Carbon black | .6 |
| Ferric oxide | .7 |
| Sulfur | 3.5 |
| Diphenylguanidine | .7 |
| Antioxidant | 5 |

Two sets of test sheets in which hydroxy fluorene was employed as the antioxidant were prepared in accordance with each of the above formulæ. One set of test pieces prepared in accordance with Formula A was subjected to what is termed a "low temperature" accelerated age test, being placed in an oxygen bomb under a pressure of 150 pounds of oxygen per square inch and at a temperature of 50 degrees C. for a period of six days. At the conclusion of this period of artificial aging, the test pieces were then removed from the bomb and subjected to physical tests in order to ascertain the tensile strength and elasticity thereof.

A corresponding set of samples prepared in accordance with Formula B was subjected to what is termed a "high temperature" accelerated age test, being placed in a bomb charged with air under a pressure of 80 pounds per square inch at a temperature of 114 degrees C. for a period of 7 hours, after which the test sheets were subjected to physical tests in order to determine the tensile strength and elasticity thereof. The results of these tests together with corresponding physical tests conducted upon the remaining sets of samples which were not subjected to artificial aging but which were included for purposes of comparison, are tabulated as follows:

2-Hydroxy Fluorene

Low temperature test

| Cure | | Modulus kgs/cm | | Tens. kgs/cm² | Elongation | Per cent weight increase |
|---|---|---|---|---|---|---|
| Mins. | F° | 500% | 700% | | | |
| *Original* | | | | | | |
| 35 | 285 | 11 | 32 | 86 | 870 | |
| 50 | 285 | 15 | 46 | 123 | 860 | |
| 70 | 285 | 20 | 70 | 137 | 810 | |
| *Aged* | | | | | | |
| 35 | 285 | 15 | 47 | 102 | 830 | |
| 50 | 285 | 19 | 62 | 132 | 825 | .09 |
| 70 | 285 | 22 | 80 | 120 | 775 | .16 |

High temperature test

| | | 300% | 500% | | | |
|---|---|---|---|---|---|---|
| *Original* | | | | | | |
| 35 | 285 | 24 | 66 | 98 | 585 | |
| 50 | 285 | 28 | 80 | 118 | 590 | |
| 70 | 285 | 31 | 88 | 137 | 600 | |
| *Aged* | | | | | | |
| 35 | 285 | 10 | 24 | 28 | 550 | |
| 50 | 285 | 14 | 35 | 44 | 555 | |
| 70 | 285 | 19 | 44 | 65 | 590 | |

By comparison of the results obtained from the artificially aged samples and the original samples before aging, it will be apparent that the samples containing the new antioxidants resist deterioration caused by oxygen to a remarkable degree even in the cases where a temperature of 114 degrees C. is employed. In fact, the samples which were subjected to the low temperature age test at 50 degrees C. exhibited almost as good physical properties as the unaged materials even after having been subjected to oxidation for a period of six days. A rubber stock containing no antioxidant, upon being subjected to similar conditions, is reduced to a resinous mass substantially void of tensile strength and elasticity.

It is to be understood that other hydroxy fluorenes and other hydroxy biphenylene oxides, such as 2-7 dihydroxy fluorene and 2-7 dihydroxy biphenylene oxide are part of of my invention. It is also to be understood that the fluorenes and biphenylene oxides used in my invention are not limited to those found in the coal tar fraction mentioned but those found in any other source may be used.

These antioxidants are particularly desirable from a commercial viewpoint because the methyl naphthalene fraction which contains the basic ingredient is obtained as a coal tar by-product for which there is little use at the present time. In addition to being excellent preservatives in the rubber in which they are incorporated, these antioxidants are substantially non-odorous and non-toxic, are relatively soluble in rubber and may be incorporated in that material with ease.

Although I have illustrated only the preferred forms of the invention, it will be apparent to those skilled in the art that the invention is not so limited but that various modifications may be made therein without departing from the spirit of the invention or from the scope of the appended claims. It is intended that the patent shall cover, by suitable expression in the appended claims, whatever features of patentable novelty reside in the invention.

What I claim is:

1. A method of preserving rubber which comprises subjecting it to vulcanization in the presence of a hydroxy derivative of a material selected from a group comprising fluorene and biphenylene oxide.

2. A method of preserving rubber which comprises subjecting it to vulcanization in the presence of a hydroxy fluorene.

3. A rubber product that has been vulcanized in the presence of a material selected from a group comprising hydroxy biphenylene oxide and hydroxy fluorene.

4. A method of preserving rubber which comprises subjecting it to vulcanization in the presence of 2-hydroxy fluorene.

5. A rubber product that has been vulcanized in the presence of 2-hydroxy fluorene.

6. A rubber product that has been vulcanized in the presence of hydroxy fluorene.

In witness whereof, I have hereunto signed my name.

Signed at Akron, in the county of Summit and State of Ohio, U. S. A., this 12th day of September, 1931.

ALBERT M. CLIFFORD.